United States Patent Office 3,793,442
Patented Feb. 19, 1974

3,793,442
PROCESS OF MAKING AMORPHOUS HIGHLY DISPERSED GERMANIUM DIOXIDE AND PRODUCT OBTAINED THEREBY
Eugen Meyer-Simon, Frankfurt am Main, Emil Heckel, Hanau am Main, Gerhard Duesing, Wolfgang, near Hanau am Main, and Franziska Renngardt, Neu-Isenburg, Germany, assignors to Deutsche Gold- und Silber-Scheideanstalt vormals Roessler, Frankfurt am Main, Germany
No Drawing. Continuation-in-part of application Ser. No. 860,057, Sept. 22, 1969. This application Oct. 27, 1972, Ser. No. 301,604
Claims priority, application Germany, Sept. 20, 1968, P 17 92 567.6
Int. Cl. C01g *17/02*
U.S. Cl. 423—618                                8 Claims

ABSTRACT OF THE DISCLOSURE

A germanium (IV) compound is subjected to hydrolyzing or oxidizing conditions in the gaseous phase or in the form of an aerosol at a temperature above 1300° C. The formed germanium dioxide is permitted to coagulate at between 200 and 1000° C. and is then separated from the gaseous reaction products.

CROSS-REFERENCE TO RELATED APPLICATION

This application is a continuation-in-part of application Ser. No. 860,057 filed on Sept. 22, 1969 and now abandoned by the same inventors in respect of "Process of Making Amorphous Highly Dispersed Germanium Dioxide and Product Obtained Thereby."

BACKGROUND OF THE INVENTION

The invention relates to a process of making an amorphous highly dispersed germanium dioxide. Germanium dioxide in recent times has been used increasingly as a catalyst in polycondensation reactions for making polyesters, for instance polyesters made from terephthalic acid and glycols. Particularly suitable for this purpose is amorphous germanium dioxide which, other than the normally hexagonally crystallized germanium dioxide is soluble in glycols such as ethylene glycol. Regarding the advantages of using amorphous germanium dioxide, see for instance British Pat. 1,039,945.

Germanium dioxide has already been formed with an amorphous structure by first obtaining crystalline germanium dioxide by hydrolysis of germanium tetrachloride and then melting the crystalline material in a second operation step by heating to about 1250° C. followed by chilling of the melt in a third step in order to avoid crystallization and finally subjecting the product to a fine grinding operation.

The thus-obtained germanium dioxide is X-ray amorphous, but has a strong tendency to crystallize. The crystallization is initiated and accelerated in the presence of moisture. Therefore, special precautions must be observed during the chilling and grinding of the material in the described process of manufacture in order to protect the product against exposure to humid air.

It is therefore an object of the present invention to provide for a process of manufacture of amorphous finely distributed germanium dioxide in a single operation without the necessity for excluding humidity during the manufacturing process.

SUMMARY OF THE INVENTION

This object is met by subjecting a mixture of gaseous germanium (IV), a fuel gas and oxygen or oxygen furnishing compound to hydrolyzing or oxidizing conditions above about 1300° C., in a constricted zone, then permitting the formed germanium dioxide to coagulate in an extended coagulation zone at a temperature between about 200 and 1000° C. followed by separation of the coagulate from the gaseous reaction product.

The invention also embraces the product obtained by the process just described, which product is characterized by a specific BET surface between 10 and 50 m.$^2$/g., a primary particle size between 5 and 200 nm., a bulk weight between 20 and 130 g. per liter, and a vibration weight between 50 and 160 g./l.

DESCRIPTION OF THE PREFERRED EMBODIMENTS

As the starting product, a volatilizable compound of germanium (IV) may be used, for instance a germanium halide, preferably the easily available germanium tetrachloride. It is, however, also possible to use volatile organic germanium compounds such as tetraethoxygermanate. The starting compounds can be used either in vaporized condition or in the form of a solution-spray.

The initial compound may be mixed with a fuel gas of a high calorific value and an oxygen-containing gas such as air or pure oxygen, and the mixture may then be subjected to the reaction conditions in a constricted zone such as a nozzle. The latter has the purpose to stabilize the flame formed upon ignition by the initial mixture. Thereafter the mass is passed into an extended coagulation zone, for instance of 15 to 50 m. length. Following this zone, a separator device is provided which may, for instance, comprise a cyclone separator or an electrostatic separator. These several steps and devices should be arranged in series.

The fuel gas and the oxidizing agent may be used in a preheated condition.

The hydrolyzing or oxidizing conditions which are necessary to convert the starting material to the amorphous germanium dioxide are established by the reaction of the fuel gas with the oxygen and in detail depend on the type of starting material. For instance, the use of a fuel gas with a high calorific value is particularly important if the starting product is germanium tetrachloride since it has been found that high temperatures are necessary to effect complete hydrolysis of this material.

In order to generate the required reaction temperature of at least 1300° C., it has been found advisable to employ hydrogen or a liquefied gas (propane-butane mixture) and to employ a sufficient amount of oxygen-containing gas or pure oxygen as oxidizing agent to permit complete reaction of the fuel gas and formation of the germanium dioxide, while on the other hand it is preferably substantially not to exceed the stoichiometric amounts.

A specific embodiment of the invention comprises introducing the starting material into a mixture of fuel gas of high calorific value and oxygen-containing gas or pure oxygen which mixture is already in a state of active reaction. In order to obtain a rapid and intimate mixture of the starting material with the fuel gas, it is preferable to introduce the starting material into the central portion of the fuel gas. In case of both embodiments described, it is preferable to employ a temperature in the reaction zone between 1400 and 1700° C. The exact reaction temperature depends particularly on the type of germanium compound that is being used. Since germanium tetrabromide and germanium iodide can be hydrolyzed more readily than germanium tetrachloride, the reaction of these two compounds can be effected in the lower portion of the temperature range indicated.

If germanium halides are used as starting material, it has been found necessary to heat up the part of the apparatus through which the reaction mixture passes during the coagulation and the separation prior to elimination of the final residue of amorphous germanium dioxide from the gaseous reaction products. This heating of the apparatus should be carried out at a temperature above 200° C. and up to 1000° C. If, for instance, germanium tetrachloride is used as starting product, the coagulation and separation of the germanium dioxide preferably is effected at a temperature between 400 and 700° C.

Surprisingly it has been found that the reverse reaction.

$$GeO_2 + 4HCl \rightleftharpoons GeCl_4 + 2H_2O$$

of the germanium dioxide with the hydrogen halide that is formed in the reaction is cut off with an increase of the temperature.

A further embodiment of the inventive process provides for recirculation of part of the exhaust gases into the original reaction after separation of the germanium dioxide. Thus, nonreacted residues of germanium compounds that may be present in the exhaust gases can be reused and do not go to waste.

It is surprising, also, that the amorphous germanium dioxide which is formed from germanium halides after its separation contains only very little chlorine (about 0.4%). This by itself very low chlorine amount can be substantially further reduced by a separate after-treatment with hot air and/or steam at 200–800° C., preferably at about 400–600° C.

There is thus obtained by the process of the invention an amorphous highly dispersed germanium dioxide of supreme purity which is further characterized as follows:

(a) by a specific BET surface of 10–50 m$^2$./g.,
(b) a primary particle size of 5–200 nm. (nanometer, 10$^{-9}$ m.),
(c) a bulk weight of 20–130 g./l., and
(d) a vibration weight (shaked weight) of 50–160 g.l.

The new amorphous product obtained by the process of the invention, when compared with the amorphous product obtained by the prior-art process of chilling after melting has a substantially increased solubility in glycols. It is, furthermore, of a surprisingly high stability against humidity in spite of its fine particle size, and therefore resists the undesirable "spontaneous crystallization" which is well known in the art in connection with the heretofore available amorphous product.

In consequence thereof, no particular precautions are necessary to exclude humidity during handling and processing of the process. This is evidenced, for instance, by the fact that if an after-treatment is used to reduce the chlorine content, crystallization of the germanium dioxide does not take place even though the employed hot air may contain water vapor.

These properties of the products of the invention are particularly surprising since the material is exposed during its manufacture and separation almost continuously to water-vapor-containing gases, but nevertheless does not suffer any reduction of the stability of the amorphous structure, as might be expected.

The following examples will further illustrate the invention.

EXAMPLE 1

The apparatus used in this case was a burner comprising a mixing chamber, a steadying chamber, and a nozzle with a nozzle opening of the diameter of 5 mm.

In this burner a homogeneous mixture of 210 Nl./h. of liquefied gas propane/butane mixture, 205 Nl./h. of germanium tetrachloride vapor, 1050 Nl./h. air and 1020 Nl./h. oxygen were brought into reaction. The fuel gas, air and oxygen were preheated to about 100° C. An additional flow of hydrogen gas in the form of a protective sleeve was played around the aperture of the burner in an amount of about 100 Nl./h. in order to prevent the depositing of germanium oxide. The coagulation zone of a length of 15 meters and the cyclones employed in the separation were maintained at a temperature of about 450° C.

There were thus formed 915 g./h. of germanium dioxide corresponding to a yield of 95% of the theoretical yield. The germanium dioxide had a BET surface of 20 m.$^2$/g., a range of primary particle size between 20 and 100 nm., a bulk weight of 80 g./l. and a vibration weight of 95 g./l. The product was soluble in ethylene glycol without practically any residue and was X-ray amorphous.

The product still contained 0.4% chlorine which was removed by an after-treatment with hot air at 600° C. up to a final residue of 0.05 wt. percent. The portion of the employed germanium which remained in the exhaust gases was recovered by a treatment in a washing column.

EXAMPLE 2

A burner similar to the one in Example 1 was used, but the nozzle opening had a diameter of 8 mm. in this case. A homogeneous mixture was brought to reaction in the burner comprising 800 Nl./h. hydrogen, 224 Nl./h. germanium tetrachloride vapor, 1880 Nl./h. air and 350 Nl./h. additional oxygen. The hydrogen, air and oxygen were preheated to about 110° C. The burner opening was covered with an additional protective sheath of hydrogen (200 Nl./h.) to avoid the depositing of germanium dioxide. The coagulation zone, which in this case had a length of 50 m., and the separator cyclones were maintained at 470° C.

There were thus formed 0.720 kg./h. of germanium dioxide corresponding to a yield of about 69%. The product had a specific surface of 50 m.$^2$/g., a range of primary particle size between 10 and 100 nm., a bulk weight of 35 g./l. and a vibration weight of 50 g./l. The product was highly soluble in ethylene glycol.

EXAMPLE 3

The same burner was used as in Example 1 with a nozzle opening of 8 mm. A mixture which had been preheated to 850° C. was brought to reaction in the burner. The mixture comprised 220 Nl./h. tetraethoxygermanate vapor, 6300 Nl./h. air and 135 Nl./h. additional oxygen. A hydrogen stream was played in the form of a protective sheath around the burner opening with a flow of 200 Nl./h. to avoid the depositing of germanium dioxide.

There was thus formed 1000 g./h. of germanium dioxide corresponding to a yield of 96% of the theoretical yield and having a specific surface of 30 m.$^2$ g.

EXAMPLE 4

In this case a heat insulated tubular reactor of a diameter of 80 mm. was used. 0.35 Nm.$^3$/h. of propane and 10 Nm.$^3$/h. of air were introduced into this reactor in a tangential direction at one end, and the fuel mixture was then ignited. After preheating of the reaction room to about 1500° C., 2.5 kg./h. of germanium tetrachloride were then introduced after prior vaporization through a nozzle into the gases which were already in condition of reaction. The introduction was effected at a high exit speed from the nozzle (larger than 50 m./sec.). The introduction of the raw material into the fuel mixture in this case was effected at a place in the reaction zone where the reaction of the fuel mixture had not been completed. Crust formation at the inlet tube was avoided by the high speed of the germanium tetrachloride vapor.

The formed reaction product was passed by means of a vacuum into the coagulation zone of a length of 50 m. and the subsequent cyclone separator. In this case there was obtained an hourly separation of 1.14 kg. germanium dioxide corresponding to 93% of the theoretical yield. The product had a specific surface of 15 m.$^2$/g. and a range of primary particle size between 30 and 140 nm.

EXAMPLE 5

The same reactor was used as in Example 4 and was heated as there described with propane gas. After shutting off the heating gas, 3.6 kg. of 73% solution of germanium tetrachloride in kerosene was sprayed by a single material nozzle. The air intake was increased to 12.8 Nm.$^3$/h., the combustion air had been heated to about 250° C.

There was obtained 1.16 kg./h. germanium oxide corresponding to a yield of 91%. The product had a specific surface of 12 m.$^2$/g. and a bulk weight of 120 g./l.

What is claimed is:

1. The process of making an amorphous highly dispersed germanium dioxide comprising premixing (a) a germanium compound selected from the group consisting of germanium (IV) chloride and tetraethoxygermanate in gaseous form, (b) a fuel gas selected from the group consisting of hydrogen and a hydrocarbon fuel gas and (c) oxygen or an oxygen-containing gas; subjecting the mixture in a constricted zone to a temperature between about 1400 and 1700° C. so as to hydrolyze it, thereafter passing the formed gaseous reaction product through an extended coagulation zone of between about 15 and 50 m. length where the reaction product is held at a temperature of at least 400° C. until the amorphous germanium dioxide coagulates into discrete particles, and finally separating the germanium dioxide from the residual gas.

2. The process of claim 1, which includes the step of an aftertreatment of the obtained germanium dioxide with air or steam or both at a temperature between 200 and 800° C. so as to reduce the chlorine content of the oxide.

3. The process of claim 1, wherein the aftertreatment is effected at a temperature between 400 and 600° C.

4. The process of claim 1, wherein the fuel gas and oxygen or oxygen-containing gas are employed in substantially stoichiometric amounts.

5. The process of claim 1, wherein the fuel gas and oxygen or oxygen-containing gas are introduced into the reaction in a preheated condition.

6. The process of claim 1, wherein the hydrocarbon fuel gas is a liquefied propane/butane gas.

7. The process of claim 1, wherein the coagulation and separation of the germanium dioxide is carried out at a temperature between 400 and 700° C.

8. The process of claim 1, wherein at least a part of the gaseous reaction product is recirculated after separation of the germanium dioxide therefrom.

References Cited

UNITED STATES PATENTS

| | | | |
|---|---|---|---|
| 2,823,982 | 2/1958 | Saladin et al. | 423—618 UX |
| 2,767,052 | 10/1956 | Harner et al. | 423—96 |
| 3,102,786 | 9/1963 | Ernst et al. | 423—89 |
| 3,130,008 | 4/1964 | Stokes et al. | 423—618 UX |
| 3,423,324 | 1/1969 | Best et al. | 423—618 UX |
| 3,455,645 | 7/1969 | Kroes | 423—618 |
| 3,467,498 | 9/1969 | Benner et al. | 423—618 X |

OTHER REFERENCES

Johnson, "Chemical Reviews," vol. 51, 1952, pp. 431, 443–446.

O'Conner, "Chemical Engineering," April 1952, pp. 158–160 and 290.

Laubengayer et al., "Journal of the American Chemical Society," vol. 54, 1932, pp. 549–552.

HERBERT T. CARTER, Primary Examiner